United States Patent
Berry

(10) Patent No.: US 10,807,520 B1
(45) Date of Patent: Oct. 20, 2020

(54) VEHICLE U-TURN SIGNAL INDICATING SYSTEM

(71) Applicant: Mark Berry, Hallandale, FL (US)

(72) Inventor: Mark Berry, Hallandale, FL (US)

( * ) Notice: Subject to any disclaimer, the term of this patent is extended or adjusted under 35 U.S.C. 154(b) by 0 days.

(21) Appl. No.: 16/547,871

(22) Filed: Aug. 22, 2019

(51) Int. Cl.
  *B60Q 1/42* (2006.01)
  *B60Q 1/38* (2006.01)
  *B60Q 1/14* (2006.01)
  *B60Q 1/34* (2006.01)

(52) U.S. Cl.
  CPC .............. *B60Q 1/38* (2013.01); *B60Q 1/1484* (2013.01); *B60Q 1/343* (2013.01)

(58) Field of Classification Search
  None
  See application file for complete search history.

(56) References Cited

U.S. PATENT DOCUMENTS

| | | | | |
|---|---|---|---|---|
| 6,043,740 A * | 3/2000 | Tan | ........................... | B60Q 1/30 340/475 |
| 6,958,687 B1 * | 10/2005 | Smith | ...................... | B60Q 1/34 340/468 |
| 8,519,840 B1 * | 8/2013 | Banks | ...................... | B60Q 1/34 340/465 |
| 2005/0168347 A1 * | 8/2005 | Sanicola | .................. | B60Q 1/50 340/815.45 |
| 2014/0091920 A1 * | 4/2014 | Thompson | ............... | B60Q 1/38 340/475 |
| 2016/0031364 A1 | 2/2016 | Kerr | | |
| 2016/0207449 A1 * | 7/2016 | Noble | ..................... | B60Q 1/34 |

* cited by examiner

*Primary Examiner* — Munear T Akki
(74) *Attorney, Agent, or Firm* — Sanchelima & Associates, P.A.; Christian Sanchelima; Jesus Sanchelima

(57) ABSTRACT

A vehicle U-turn signal indicating system for alerting on-coming and trailing vehicles to an operator's intention to make a U-turn is disclosed herein. The vehicle U-turn signal indicating system comprises a first lighting system provided at a front of a vehicle. Additionally, the vehicle U-turn signal indicating system also comprises a second lighting system provided at a rear of the vehicle. Furthermore, the vehicle U-turn signal indicating system includes a first U-turn signal activator and a second U-turn signal activator provided in the vehicle. The first U-turn signal activator is activated to flash the first lighting system and the second lighting system. The second U-turn signal activator is activated to flash the first lighting system and the third lighting system to alert the on-coming and the following vehicles to an operator's intention to make a U-turn.

6 Claims, 5 Drawing Sheets

VEHICLE U-TURN SIGNAL INDICATING SYSTEM

BACKGROUND OF THE INVENTION

1. Field of the Invention

The present disclosure generally relates to a vehicle signaling devices. More particularly, the present disclosure relates to a vehicle U-turn signal indicating system provided at a vehicle for alerting on-coming and following vehicles to the operator's intention to make a U-turn.

2. Description of the Related Art

It is known that whenever an operator of a vehicle needs to make a U-turn, the operator uses a turn signal to indicate his intention to make the turn to on-coming vehicles, following vehicles, vehicles at crossroads and pedestrians. However, the turn signal may also indicate the intention of the operator to make a right or left turn, leaving the on-coming and following vehicles confused, which might result in them slowing down until the vehicle completes the turn. Therefore, the turn signal is insufficient in alerting the on-coming vehicles, the following vehicles, the vehicles at crossroads and the pedestrians to the operator's real intention.

In order to clearly alert the on-coming vehicles, the following vehicles, the vehicles at crossroads and the pedestrians to the operator's real intention to make the U-turn, several U-turn signal devices have been proposed in the past. The U-turn signal devices are mounted at front and rear side of the vehicle. The operator of the vehicle may activate the U-turn signal device with the help of a lever provided at the steering wheel or at the dashboard of the vehicle.

One such example is disclosed in a United States patent application 20160031364. In US20160031364A1, the inventor proposes a U-turn signaling system for motor vehicles using a grouped series of 2 or 3 rapid turn indicator flashes followed by an interval and repeated in a continuous manner, distinct from the regularly repeating single flash of current left or right turn signal indicators. Additionally, the reference alerts other vehicles and pedestrians of a vehicle's impending U-turn thus allowing for a safer and more unimpeded flow of traffic through intersections and on streets and roadways for all police, civilian, and emergency vehicles.

Although the U-turn signal device disclosed above is useful in alerting the on-coming vehicles, the following vehicles, the vehicles at crossroads and the pedestrians to the operator's real intention to make U-turn, it has a few problems. For example, the U-turn signal devices discussed above are very small. As a result, speeding on-coming vehicles and the following vehicles may not notice operator's intention to make U-turn and cause accidents. The present invention addresses this issue by providing a system of U-turn signals including a first lighting system, a second lighting system, and a third lighting system. Theses lighting systems provides drivers in the road a clear and visible signal from operators who intend to make a U-turn.

Other documents describing the closest subject matter provide for a number of more or less complicated features that fail to solve the problem in an efficient and economical way. None of these patents suggest the novel features of the present invention. Specifically, none of the disclosures in the art disclose a unique vehicle U-turn signal indicating system provided at a vehicle for alerting on-coming and following vehicles to operator's intention to make U-turn as disclosed in the present disclosure.

Therefore, there is a need in the art for a vehicle U-turn signal indicating system provided at a vehicle for alerting on-coming and following vehicles to operator's intention to make U-turn.

SUMMARY OF THE INVENTION

It is one of the objects of the present invention to provide a vehicle U-turn signal indicating system for alerting on-coming and following vehicles to the operator's intention to make a U-turn and that avoids the drawbacks of the prior art.

It is another object of the present invention to provide a vehicle U-turn signal indicating system for alerting on-coming and following vehicles to operator's intention to make U-turn to reduce accidents and injuries from vehicles making U-turn.

It is still an object of the present invention to provide a vehicle U-turn signal indicating system provided at a vehicle to work in conjunction with turn signal lights of the vehicle.

It is one object of the present invention to provide a vehicle U-turn signal indicating system comprising U shaped lights to make it clear to the on-coming and the following vehicles that the operator is going to make a U-turn.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses a vehicle U-turn signal indicating system for alerting on-coming and following or trailing vehicles to an operator's intention to make a U-turn. The vehicle U-turn signal indicating system comprises a first lighting system provided at a front end of a vehicle. The first lighting system comprises a first U-shaped frame, a plurality of first lights provided at the first U-shaped frame and a first center light. The vehicle U-turn signal indicating system comprises a second lighting system provided at a rear left of the vehicle. The second lighting system comprises a second U-shaped light and a second center light. The vehicle U-turn signal indicating system comprises a third lighting system provided at a rear right of the vehicle. The third lighting system comprises a third U-shaped frame, a plurality of third lights provided at the third U-shaped frame, and a third center light. The vehicle U-turn signal indicating system comprises a first U-turn signal activator and a second U-turn signal activator provided in the vehicle. The first U-turn signal activator is activated to flash the first lighting system and the second lighting system, and the second U-turn signal activator is activated to flash the first lighting system and the third lighting system to alert the on-coming and the following vehicles to operator's intention to make U-turn.

Various features and embodiments of a vehicle U-turn signal indicating system for alerting on-coming and following vehicles to operator's intention to make U-turn are explained in conjunction with the description of FIGS. 1-7.

Figure 1:
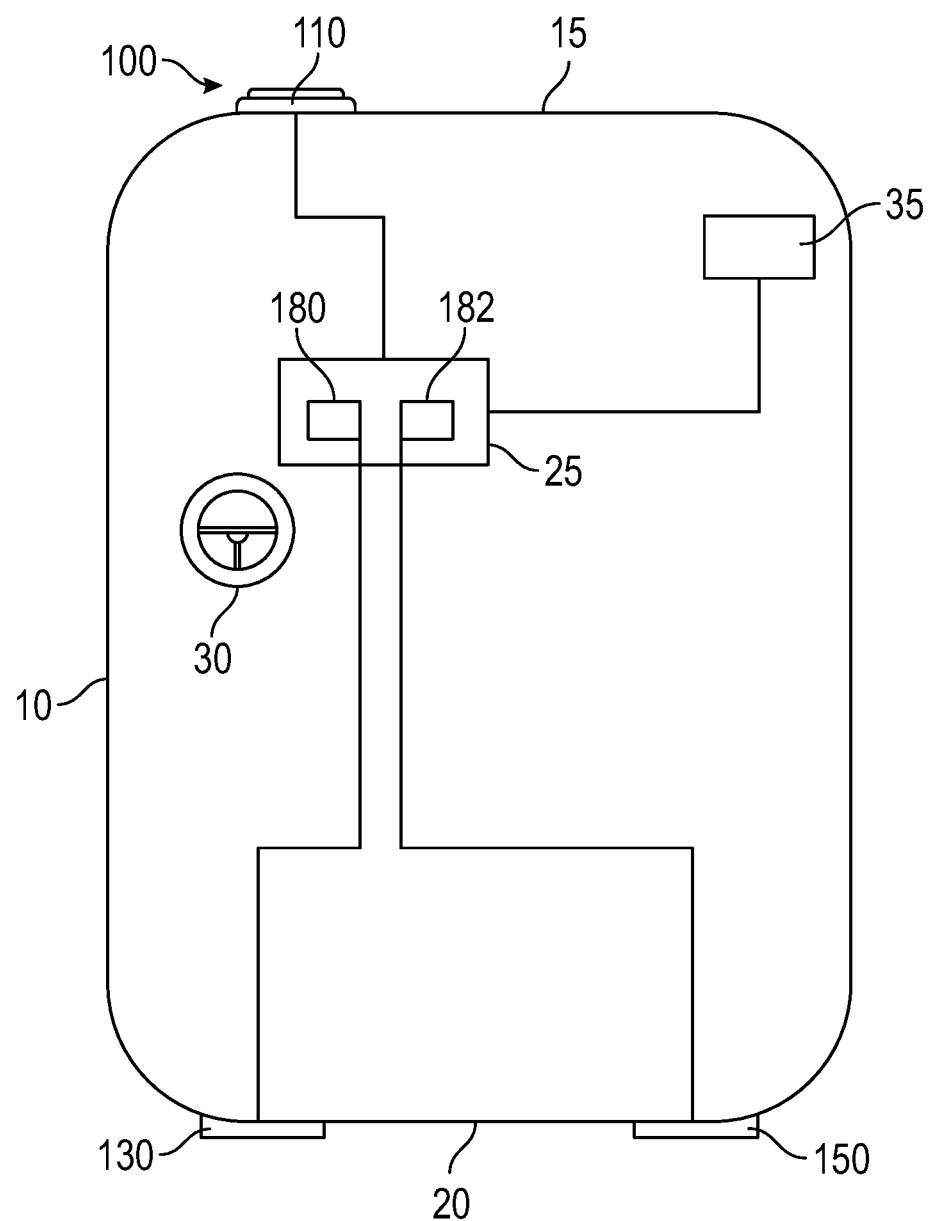
FIG. 1 illustrates a schematic diagram of a vehicle U-turn signal indicating system 100 implemented in a vehicle 10, in accordance with one embodiment of the present disclosure.

Referring to FIG. 1, a schematic diagram of a vehicle U-turn signal indicating system 100 implemented in a vehicle 10 is shown. The vehicle 10 may include, but not limited to, a car, a bus, a truck, a semi-truck and so on. The vehicle 10 comprises a front end 15 and a rear end 20. The front end 15 may indicate a front side of the vehicle 10. The rear end 20 might indicate a rear side of the vehicle 10. As known, the vehicle 10 may comprise a dashboard 25, a steering wheel 30 and a battery 35.

The U-turn signal indicating system 100 comprises a first lighting system 110. The first lighting system 110 might be mounted at the first end 15 of the vehicle 10. As can be seen from FIG. 1, first lighting system 110 might be mounted at front left side of the vehicle 10. It should be understood that if the steering wheel 30 is provided at left side of the vehicle 10, then the first lighting system 110 is provided at front left side of the vehicle 10. Similarly, if the steering wheel 30 is provided at right side of the vehicle 10, then the first lighting system 110 is provided at front right side of the vehicle 10.

Figure 2:
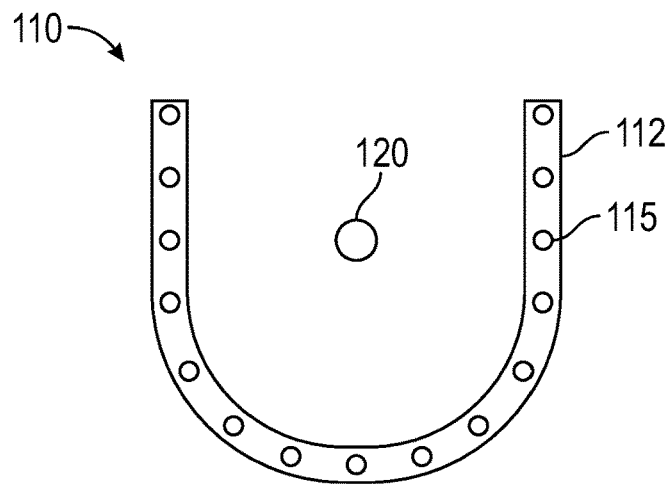
FIG. 2 illustrates a first lighting system 110, in accordance with one embodiment of the present disclosure.

Referring to FIG. 2, the first lighting system 110 is shown, in accordance with one embodiment of the present disclosure. The first lighting system 110 comprises a first U-shaped frame 112 that can be removably or permanently mounted at the front left of the vehicle 10. The first U-shaped frame 112 might be mounted to the vehicle 10 using known mechanism such as fasteners, adhesive and so on. Further, the first lighting system 110 comprises a plurality of first lights 115 arranged in series over the first U-shaped frame 112. In one example, the plurality of first lights 115 might be provided at an equal distance from one another. In another example, the plurality of first lights 115 might be provided at varied distances from one another. The first lighting system 110 further comprises a first center light 120. The first center light 120 might indicate a light that is centrally located in the first U-shaped frame 112. In one example, the first center light 120 might be provided in a circular or square or any other shape.

Figure 3:
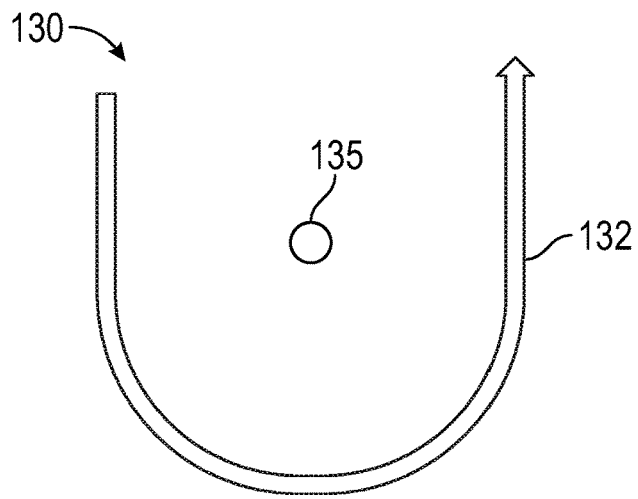
FIG. 3 illustrates a second lighting system 130, in accordance with one embodiment of the present disclosure.

Further, the U-turn signal indicating system 100 comprises a second lighting system 130. The second lighting system 130 might be mounted at rear end 20 of the vehicle 10. As can be seen from FIG. 1, the second lighting system 130 might be mounted at the rear left of vehicle 10. Referring to FIG. 3, the second lighting system 130 is shown, in accordance with one embodiment of the present disclosure. The second lighting system 130 comprises a second U-shaped light 132. The second U-shaped light 132 might be removably or permanently mounted at the rear left of the vehicle 10. The second U-shaped light 132 might be mounted to the vehicle 10 using known mechanism such as fasteners, adhesive and so on. Further, the second lighting system 130 comprises a second center light 135. The second center light 135 might indicate a light that is centrally located in the second U-shaped light 132. In one example, the second center light 135 might be provided in a circular or square or any other shape.

Figure 4:
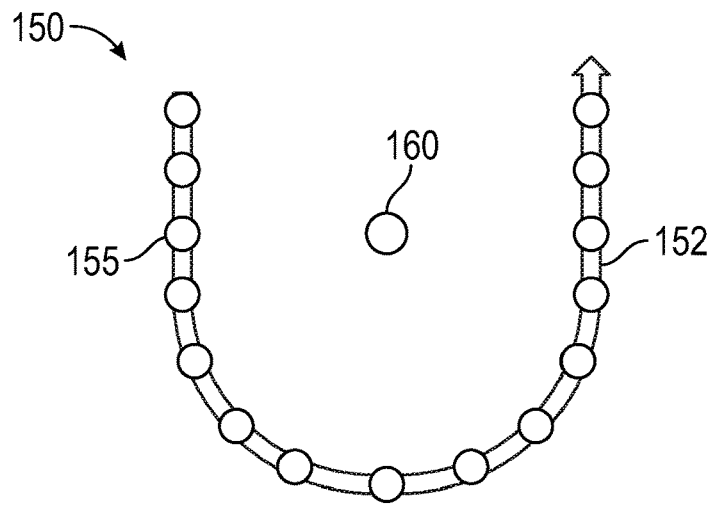
FIG. 4 illustrates a third lighting system 150, in accordance with one embodiment of the present disclosure.

Further, the U-turn signal indicating system 100 comprises a third lighting system 150. The third lighting system 150 might be mounted at the rear end 20 of the vehicle 10. As can be seen from FIG. 1, the third lighting system 150 might be mounted at rear right of the vehicle 10. Referring to FIG. 4, the third lighting system 150 is shown, in accordance with one embodiment of the present disclosure. The third lighting system 150 comprises a third U-shaped frame 152. The third U-shaped frame 152 might be mounted to the vehicle 10 using known mechanism such as fasteners, adhesives and so son. Further, the third U-shaped frame 152 comprises a plurality of third lights 155 arranged in series over the U-shaped frame 152. In one example, the plurality of third lights 155 might be provided at equal distances from one another. In another example, the plurality of third lights 155 might be provided at varied distances from one another. The third lighting system 150 further comprises a third center light 160. The third center light 160 might indicate a light that is centrally located in the third U-shaped frame 152. In one example, the third center light 160 might be provided in a circular or square or any other shape.

Now referring to FIG. 1, the U-turn signal indicating system 100 comprises a first U-turn signal activator 180 and a second U-turn signal activator 182. Each of the first U-turn signal activator 180 and the second U-turn signal activator 182 may indicate a lever, switch, button that might be provided at the dashboard 25. Alternatively, the first U-turn signal activator 180 and the second U-turn signal activator 182 might be provide at the steering wheel 30. It should be understood that the first U-turn signal activator 180 is electrically mounted to the first lighting system 110 and the second lighting system 130. Further, the second U-turn signal activator 182 is electrically mounted to the first lighting system 110 and the third lighting system 150. In an alternate embodiment first U-turn signal activator 180 and second U-turn signal activator 182 may instead be controlled by one same activator. Meaning there may be one lever, switch or button that controls and activates both corresponding U-turn signals together.

Figure 5:
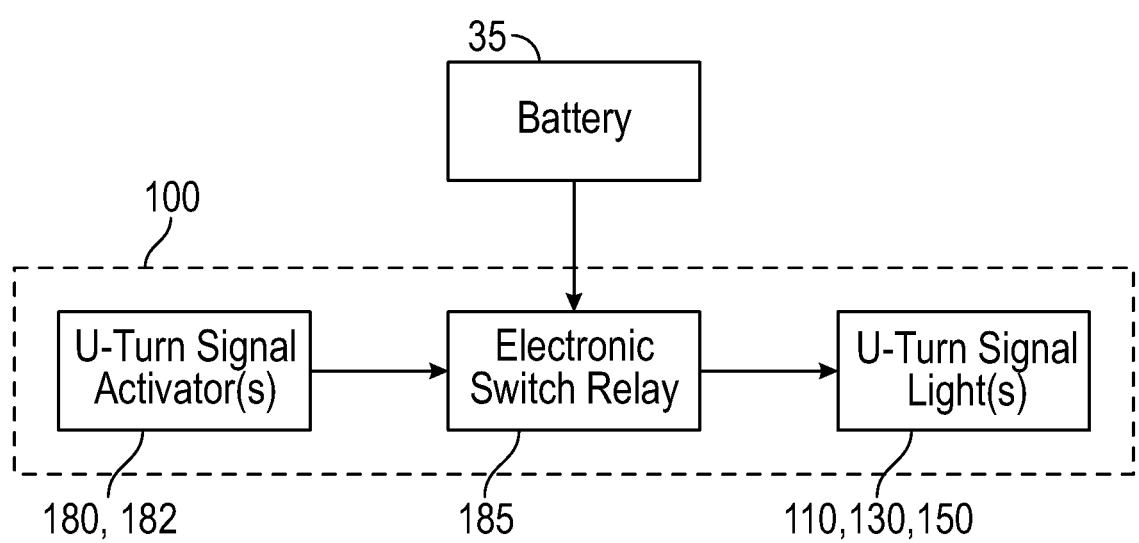
FIG. 5 illustrates a block diagram of the vehicle U-turn signal indicating system 100, in accordance with one embodiment of the present disclosure.

Further, referring to FIG. 5, each of the first U-turn signal activator 180 and a second U-turn signal activator 182 is electrically mounted to an electronic switch relay 185. The electronic switch relay 185 might be electrically mounted to the battery 35 to draw power from the battery 35 and operate each of the first lighting system 110, the second lighting system 130, and third lighting system 150.

Figure 6:
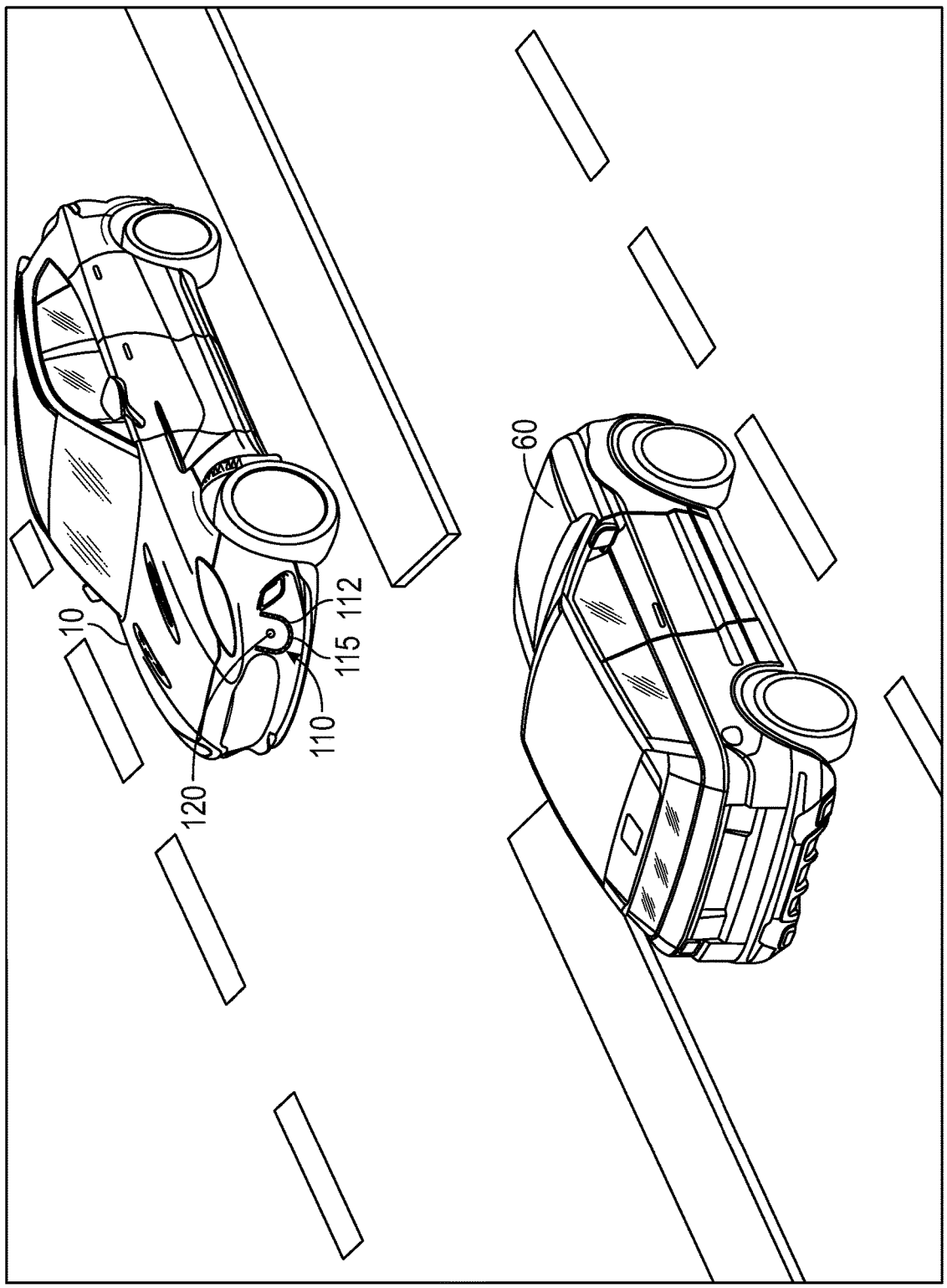
FIG. 6 illustrates an operational view of the vehicle U-turn signal indicating system 100, in accordance with one embodiment of the present disclosure.
Figure 7:
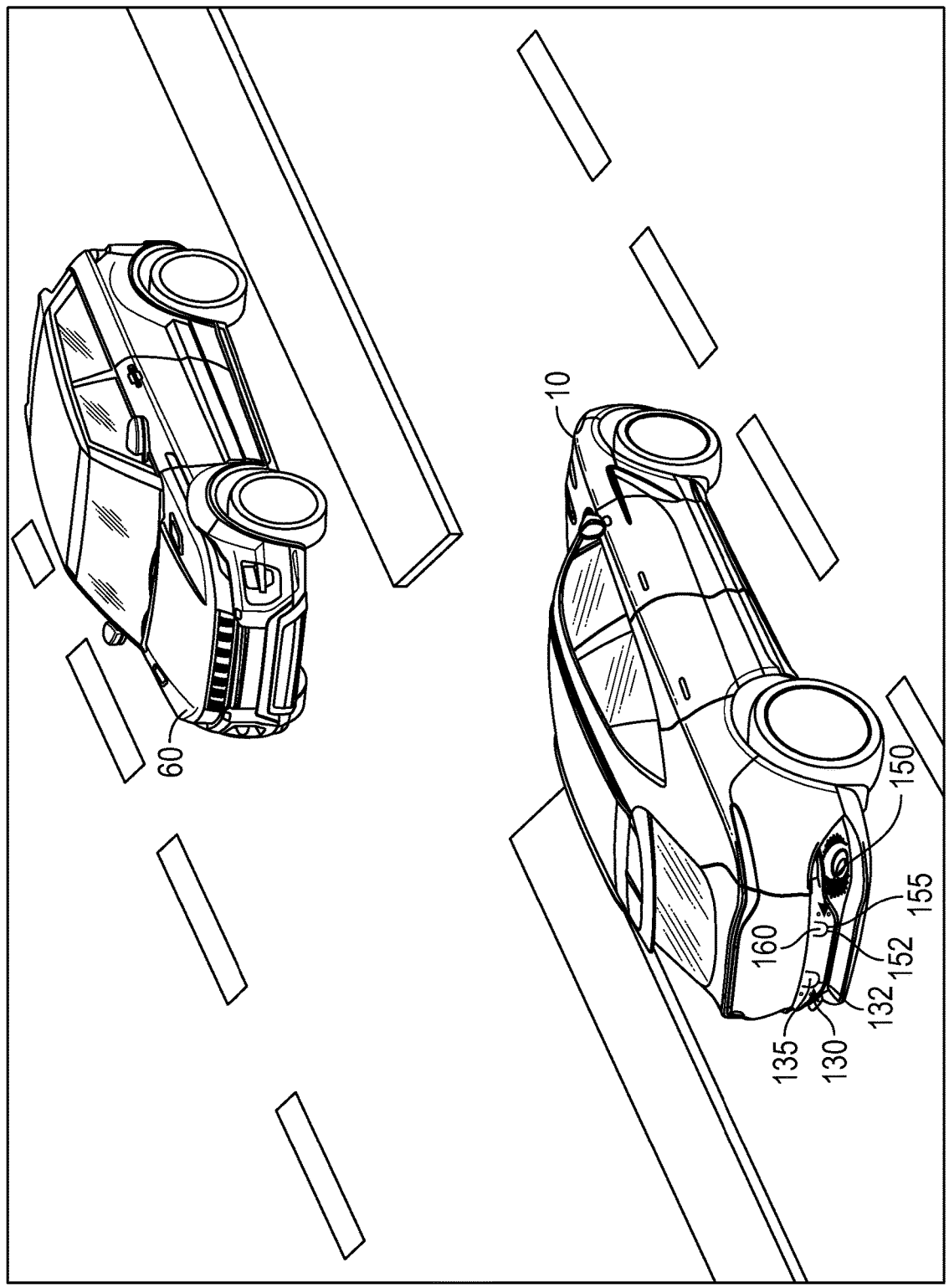
FIG. 7 illustrates another operational view of the vehicle U-turn signal indicating system 100, in accordance with one embodiment of the present disclosure.

Now referring to FIGS. 6 and 7, operation of the U-turn signal indicating system 100 is explained. Specifically, FIGS. 6 and 7 show an illustrative view in which an operator of the vehicle 10 intends to make U-turn at an intersection or divider. In order to make a U-turn from left side of the vehicle 10, the operator may engage the first U-turn signal activator 180. In order to engage the first U-turn signal activator 180, the operator or driver of the vehicle 10 may push the first U-turn signal activator 180 once or twice, up or down to activate the first lighting system 110 and the second lighting system 130. It should be understood that when the first U-turn signal activator 180 is engaged, it might activate the electronic switch relay 185, allowing current to flow through the electronic switch relay 185 thus causing the first lighting system 110 and the second lighting system 130 to flash. As such, the first lighting system 110 comprising the plurality of first lights 115 and the first center light 120 are made to flash. As specified above, the plurality of first lights 115 are provided in the first U-shaped frame 112. As such, when the plurality of first lights 115 is flashed, they illuminate to indicate shape of "U" thereby alerting an on-coming vehicle 60 to operator's intention to make U-turn, as shown in FIG. 6.

Simultaneously, when the first U-turn signal activator 180 is engaged, the second lighting system 130 is also made to flash. Referring to FIG. 7, a rear illustrative view of the vehicle 10 in which second end 20 of the vehicle 10 is shown. When the operator engages the first U-turn signal activator 180, the second lighting system 130 comprising the second U-shaped light 132 and the second center light 135 are made to flash. As the second U-shaped light 132 is provided in "U" shape, following or trailing vehicles will be alerted to the operator's intention to make a U-turn, as shown in FIG. 7. It should be understood that when the operator wishes to take left U-turn, then both the first lighting system 110 and the second lighting system 130 will be flashed simultaneously to alert both the on-coming vehicles 60 and the following vehicles. As a result, both the on-coming vehicles 60 and the following vehicles will be alerted of the operator's intention to make left U-turn.

Similarly, if the operator wishes to make a U-turn towards the right direction, then the operator may engage the second U-turn signal activator 182. In order to engage the second U-turn signal activator 182, the operator or driver of the vehicle 10 may push the second U-turn signal activator 182 once or twice, up or down to activate the first lighting system 110 and the third lighting system 150. It should be understood that when the second U-turn signal activator 182 is engaged, it might activate the electronic switch relay 185, allowing current to flow through the electronic switch relay 185 thus causing the first lighting system 110 and the third lighting system 150 to flash. As such, the first lighting system 110 comprising the plurality of first lights 115 and the first center light 120 are made to flash. As specified above, the plurality of first lights 115 are provided in the first U-shaped frame 112. As such, when the plurality of first lights 115 is flashed, they illuminate to indicate shape of "U" thereby alerting an on-coming vehicle 60 to operator's intention to make U-turn.

Simultaneously, when the second U-turn signal activator 182 is engaged, the third lighting system 150. When the operator engages the second U-turn signal activator 182, the third lighting system 150 comprising the plurality of third lights 155 and the third center light 160 are made to flash. As the plurality of third lights 155 are provided at the third U-shaped frame 152 is provided in "U" shape, following vehicles or trailing vehicles will be alerted to an operator's intention to make a U-turn.

It should be understood that the U-turn indicator system 100 comprising the first lighting system 110, the second lighting system 130 and the third lighting system 150 might be with different colored external lights e.g., blue, red, green or orange for U-turn signaling.

It should be understood that the U-turn indicator system 100 comprising the first lighting system 110, the second lighting system 130 and the third lighting system 150 can be provided with new vehicles or might be fitted to existing vehicles.

As each of the first lighting system, the second lighting system and the third lighting system provided in suitable sizes, the coming and the following vehicles clearly will be able to see the center light and U-shaped lights thereby paying attention to the vehicle making U-turn. After paying attention, the on-coming and the following vehicles can slow down or take precaution to avoid collision with the vehicle taking U-turn.

In one example, the first U-turn signal activator and a second U-turn signal activator might be incorporated into conventional turn signal switch or lever assemblies or may be separately installed elsewhere on the steering wheel. If fitted with the conventional turn signal switch assemblies, a single push may activate the turn signal and double push may activate respective U-turn signal activator.

Based on the above, it is evident that the vehicle might be provided with vehicle U-turn signal indicating system comprising a center light and a plurality of lights in a U-shaped configuration, which can be operated to flash for alerting on-coming and following vehicles to operator's intention to make U-turn. Thus, the vehicle U-turn signal indicating system helps in reducing accidents and injuries from vehicles making U-turn.

Further, it should be understood that shape, size and placement of the each components shown in figures are provided for illustrative purpose only and should not be construed in limited sense. A person skilled in the art will appreciate alternate parts and/or mechanisms might be used to implement the embodiments of the present disclosure and such implementations will be within the scope of the present disclosure.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A vehicle U-turn signal indicating system, comprising:
   a first lighting system provided at a front end of a driver's side of a vehicle, wherein the first lighting system comprises a first U-shaped frame, said first U-shaped frame having a first width, wherein the first U-shaped frame is provided with a plurality of first lights, wherein said plurality of first lights have a circular shape, said plurality of first lights mounted along said first U-shaped frame and being equally spaced apart, wherein said plurality of first lights are entirely within said first width of said first U-shaped frame, and wherein the first U-shaped frame further comprises a first center light, wherein said first center light is a circular light centrally located within said first U-shaped frame;
   a second lighting system provided at a rear left of the vehicle, wherein the second lighting system comprises a second U-shaped light having a second width, wherein said second U-shaped light is a continuous lighting structure forming a U-shape, wherein the second lighting system further comprises a second center light, wherein said second center light is a circular light centrally located within said second U-shaped light;

a third lighting system provided at a rear right of the vehicle, wherein the third lighting system comprises a third U-shaped frame, wherein said third U-shaped frame includes a third width, wherein the third U-shaped frame is provided with a plurality of third lights, wherein said plurality of third lights are mounted along said third U-shaped frame and are equally spaced apart, wherein said plurality of third lights are circular lights having a diameter, wherein said diameter of said plurality of third circular lights are greater than said a third width of said third U-shaped frame, wherein the third lighting system further comprises a third center light, wherein said third center light is a circular light centrally located within said second U-shaped frame;

a first U-turn signal activator and a second U-turn signal activator provided in the vehicle, wherein the first U-turn signal activator is activated to flash the first lighting system and the second lighting system to alert on-coming and trailing vehicles to an operator's intention to make a U-turn in a left direction, and wherein the second U-turn signal activator is activated to flash the first lighting system and the third lighting system to alert the on-coming and the following vehicles to the operator's intention to make a U-turn in a right direction; and an electronic switch relay electrically mounted to the first U-turn signal activator and the second U-turn signal activator, and the first lighting system, the second lighting system and the third lighting system.

2. The vehicle U-turn signal indicating system of claim 1, wherein the electronic switch relay is electrically mounted to a battery of the vehicle.

3. The vehicle U-turn signal indicating system of claim 1, wherein the first U-turn signal activator and the second U-turn signal activator are provided at a dashboard of the vehicle.

4. The vehicle U-turn signal indicating system of claim 1, wherein the first U-turn signal activator and the second U-turn signal activator are provided at a steering wheel of the vehicle.

5. The vehicle U-turn signal indicating system of claim 1, wherein said first lighting system, said second lighting system, and said third lighting system are mounted onto a vehicle having a front end and a rear end.

6. A vehicle U-turn signal indicating system comprising:
a first lighting system provided at a front end of a driver's side of a vehicle, wherein the first lighting system comprises a first U-shaped frame, said first U-shaped frame having a first width, wherein the first U-shaped frame is provided with a plurality of first lights, wherein said plurality of first lights have a circular shape, said plurality of first lights mounted along said first U-shaped frame and being equally spaced apart, wherein said plurality of first lights are entirely within said first width of said first U-shaped frame, and wherein the first U-shaped frame further comprises a first center light, wherein said first center light is a circular light centrally located within said first U-shaped frame;

a second lighting system provided at a rear left of the vehicle, wherein the second lighting system comprises a second U-shaped light having a second width, wherein said second U-shaped light is a continuous lighting structure forming a U-shape, wherein the second lighting system further comprises a second center light, wherein said third center light is a circular light centrally located within said second U-shaped frame, wherein said second U-shaped light includes a first U-end and a second U-end, wherein said first U-end is a flat end, wherein said second U-end includes a first arrowhead structure extending therefrom;

a third lighting system provided at a rear right of the vehicle, wherein the third lighting system comprises a third U-shaped frame, wherein said third U-shaped frame includes a third width, wherein the third U-shaped frame is provided with a plurality of third lights, wherein said plurality of third lights are mounted along said third U-shaped frame and are equally spaced apart, wherein said plurality of third lights are circular lights having a diameter, wherein said diameter of said plurality of third circular lights are greater than said a third width of said third U-shaped frame, wherein the third lighting system further comprises a third center light, wherein said third center light is a circular light centrally located within said second U-shaped frame, wherein said third U-shaped light includes a first U-end and a second U-end, wherein said first U-end is a flat end, wherein said second U-end includes a second arrow head structure extending therefrom;

a first U-turn signal activator and a second U-turn signal activator provided in the vehicle; and an electronic switch relay electrically mounted to the first U-turn signal activator and the second U-turn signal activator, and the first lighting system, the second lighting system and the third lighting system, wherein the first U-turn signal activator is activated to flash the first lighting system and the second lighting system to alert on-coming and following vehicles to the operator's intention to make a U-turn in a left direction, and wherein the second U-turn signal activator is activated to flash the first lighting system and the third lighting system to alert the on-coming and the following vehicles to the operator's intention to make a U-turn in a right direction.

* * * * *